United States Patent
Linhardt et al.

[11] 3,902,546
[45] Sept. 2, 1975

[54] GAS FIRED HEAT/COOL SYSTEM

[75] Inventors: Hans D. Linhardt, Costa Mesa; John H. Beveridge, San Clemente, both of Calif.

[73] Assignee: Airco, Inc., Montvale, N.J.

[22] Filed: June 26, 1974

[21] Appl. No.: 483,210

[52] U.S. Cl. .................... 165/29; 62/324; 165/62
[51] Int. Cl.² .................................... F25B 29/00
[58] Field of Search ........ 62/172, 238, 324; 165/48, 165/29, 17, 15, 42, 43, 62

[56] References Cited
UNITED STATES PATENTS

| | | | |
|---|---|---|---|
| 2,409,159 | 10/1946 | Singleton | 165/62 |
| 2,468,626 | 4/1949 | Graham | 165/29 |
| 2,471,123 | 5/1949 | Rouy | 62/238 |
| 2,562,748 | 7/1951 | Smith | 62/324 |
| 3,371,504 | 3/1968 | Brindley | 62/324 |

*Primary Examiner*—Albert W. Davis, Jr.
*Assistant Examiner*—Daniel J. O'Connor
*Attorney, Agent, or Firm*—Roger M. Rathbun; Edmund W. Bopp; H. Hume Mathews

[57] ABSTRACT

A combined heat/cool system, having at least two heat exchanger ducts, for providing heating during winter and cooling during summer. For the cooling system, an open cycle, regenerated, production gas turbine drives a high speed centrifugal Freon compressor in a conventional Rankine refrigeration cycle. For heat system operation, a shaft coupling permits direct connection of the gas turbine to a high speed compressor assembly of a reverse Brayton air cycle heat pump system. A condenser, reservoir, sub-cooler superheat exchanger, expansion valve, and evaporator function as conventional components in the Rankine cycle. Air and/or water streams are passed in heat exchange relationship with the evaporator coils and condenser coils to transfer heat to and from the Rankine system, thereby heating and cooling the ventilation streams accordingly. In the winter, the ventilation stream is heated by being passed by the condenser coils. The evaporator coils continually operate at approximately 40°F during both the winter and summer. In the summer, the ventilation stream passing through the associated heat exchanger is cooled and dehumidified by the cold evaporator coils. In the winter the outside air temperature can drop below 40°F, whereby no heat would be transferred to the evaporator. Under these conditions the mechanical coupling and air cycle heat pump are energized, whereby the outside ambient air is heated by compression and passed over the evaporator coils to provide heat to the coils. The thus cooled ambient air is then expanded in a turbine, and the very cold expanded air at a temperature below that of the ambient air is returned to the outside atmosphere, thus heat is pumped from the outside ambient air to the evaporator.

8 Claims, 2 Drawing Figures

GAS FIRED HEAT/COOL SYSTEM

BACKGROUND OF THE INVENTION

This invention relates generally to apparatus for transferring heat energy via compression and expansion of fluids in mechanical refrigeration and heat pumping cycles, and more specifically relates to a system of the type which provides both heating and cooling capabilities.

Human comfort and productivity require close temperature and humidity control. For centuries fossil fuels have been used to supply heat, and in recent years refrigeration equipment effecting transfer of heat energy via mechanical means involving the compression and expansion of a working fluid, have been used for cooling and humidity control. Observation will confirm that the bulk of such refrigeration equipment utilizes electrical energy for its prime source of power, and indeed the rapid growth of air conditioning capacity in the United States has, within recent years, placed virtually intolerable demands upon utility systems for electric power; and has similarly increased demand for power plant, and for waste heat rejection and cooling facilities.

Since a mechanical refrigeration system employing compression and expansion of fluids for heat transfer is inherently capable of providing both cooling and heating effects, numerous proposals have been made over the years for systems of this type which are capable of providing both functions in a unitary system. Present air conditioning systems, however, are generally based upon separate systems for winter heating, and for summer cooling and humidity control. Here it may be noted that several problems have tended to prevent development of a fully acceptable unitary system. Among them is the fact that winter-time operations involve displacement of moist outside cold air over the evaporator coils of the unitary heat pumping system. But when such moist, cold air impinges on the evaporator coils, ice deposits on the heat transfer surfaces, thereby effectively insulating the heat transfer surfaces, and eventually closing the air flow passages.

The bulk of unitary heat/cool systems which have in the past been proposed, tended further to be of massive construction and to utilize mechanical elements producing high levels of vibration and noise. Many such prior art systems have additionally been markedly inefficient, in consequence of which their usefulness and commercial acceptability was quite low.

SUMMARY OF THE INVENTION

Now, in accordance with the present invention, the foregoing difficulties inherent in the prior art combined heat/cool systems are overcome and there is thus achieved a combined heat/cool system having at least two heat exchanger ducts for providing heat during winter, and cooling during the summer. For the cooling system, a prime mover, which preferably may be a gas turbine drives a high speed centrifugal Freon compressor in a conventional Rankine refrigeration cycle. For heat system operation, a shaft coupling (when activated) permits direct connection of the turbine with a high speed turbo-compressor assembly of a reverse Brayton air cycle heat pump system. This latter arrangement eliminates the problem otherwise tending to arise when moist, ambient, cool air impinges on the evaporator coils in the winter by providing a heat source to the evaporator coils. The reverse Brayton air cycle heat pump warms the moist cold outside air to a temperature usable to supply a heat source for the 40°F evaporator. In consequence the very efficient Rankine cycle heat pump is used for some of the temperature rise, and the less efficient Brayton air cycle is used only to raise the air temperature enough to overcome freezing of moisture on evaporator heat transfer surfaces. The cold air and frozen moisture (snow), leaving the expansion turbine of the air cycle, may be gravity separated, and the residual thermal energy in the prime mover exhaust may be used for melting the snow; thus, the snow removal problem can also be overcome by the invention. In consequence of the foregoing arrangement, the same basic system can be used for air conditioning, both in winter and summer. The fuel requirements in winter are less than a conventional furnace, because of the heat pumped in from the atmosphere. Thus, the ratio of the overall system thermal energy output to the amount of consumed fuel is significantly lower than is provided by conventional approaches. The present system, furthermore, is relatively small and compact, because only rotating machinery is used. Mechanical vibration is inherently low; therefore, in general, noise is at very reduced levels.

BRIEF DESCRIPTION OF THE DRAWINGS

The invention is diagrammatically illustrated by way of example in the drawings appended hereto, in which.

DESCRIPTION OF PREFERRED EMBODIMENT

Figure 1:
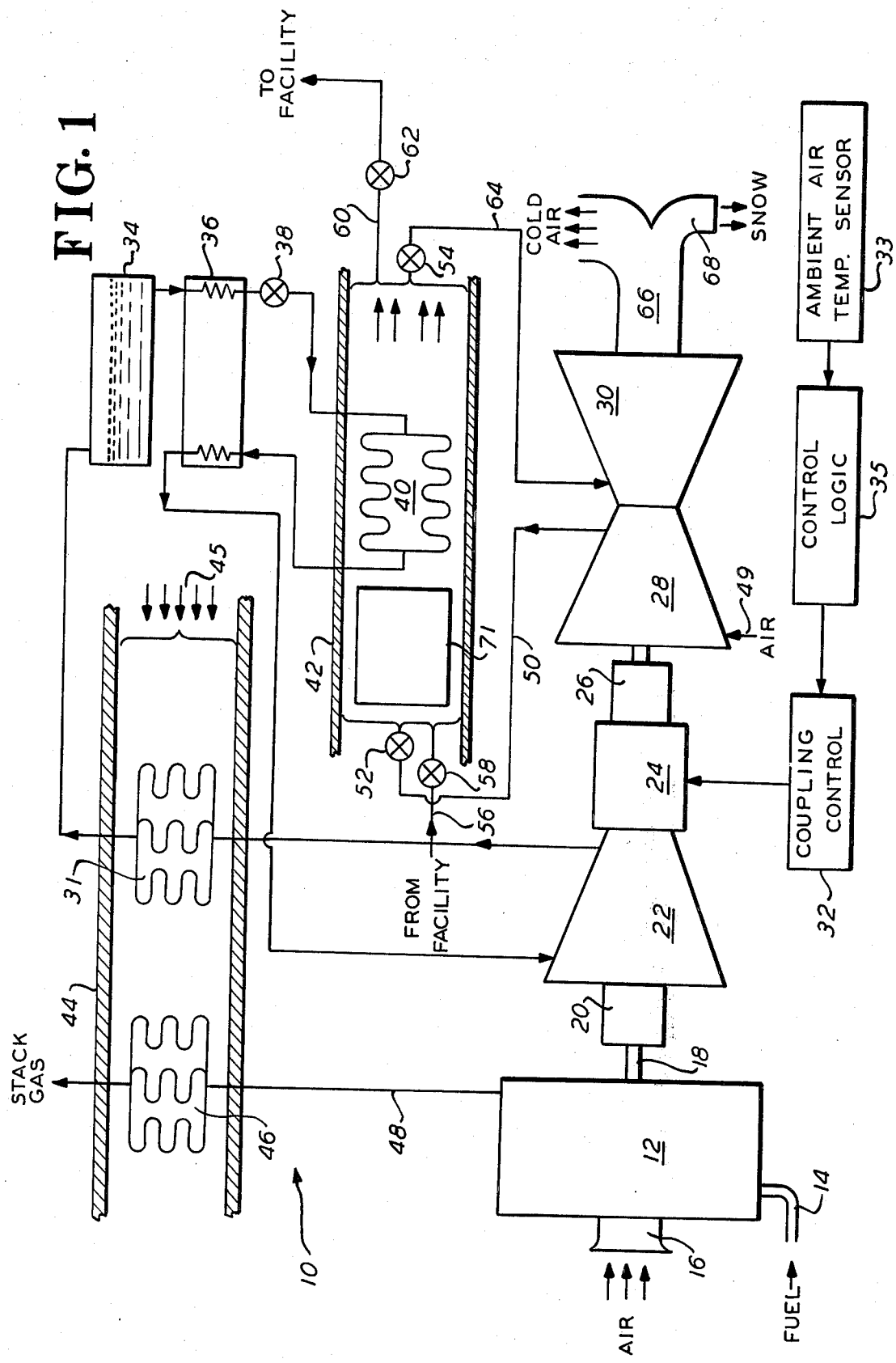
FIG. 1 is a simplified schematic diagram for a heat/cool system in accordance with the present invention.

In FIG. 1 herein a simplified schematic diagram appears for an overall heat/cool system 10 in accordance with the present invention. The system 10 is preferably driven by a commerically available regenerative gas turbine 12, which serves as the prime mover for the system. A fuel, such as natural gas, is supplied to turbine 12 via conduit 14, and is mixed with air entering through intake 16. In a typical system the turbine 12 may have a capacity of the order of 400 hp. Turbines of the present type, as is known, have low specific fuel consumption, and generally include a complete control system. Turbine 12 is coupled through a shaft 18 and seal 20 to a high speed centrifugal refrigeration compressor 22, which serves to compress a refrigerant such a Freon, for a conventional Rankine refrigeration cycle. Refrigerator compressor 22 may be a single stage, mixed flow device, with oil lubricated bearings. Mechanical shaft seals of the lapped face type (one of which is seen at 20) prevent leakage of refrigerant out of the closed system. Oil from the bearing cavities may, as is known in the art, cool and lubricate the seal faces. The pressure of the refrigerant is always greater than atmospheric pressure, so that air-oil cannot leak into the refrigeration circuit. Variable speed operation of the turbine 12, in conjunction with a backward curve vane angle of the associated impeller, allows variable flow rates through the compressor while maintaining desired pressure differential. This permits a wide range of operation for the refrigeration system.

The same shaft 18 which drives compressor 22 is also connectable through a shaft coupling 24 and seal 26, to allow direct connection of turbine 12 to a high speed turbo-compressor assembly, including an air compressor 28 and expansion turbine 30, forming part of a reverse Brayton air cycle heat pump system. Since operation of the air compressor 28 and commonly driven air turbine 30 is not required continuously, provision for coupling units 28 and 30 to gas turbine 12 is required. The said coupling 24 may, therefore, comprise a hydraulic oil coupling which is energized by filling with oil and decoupled by allowing the oil to drain out. This coupling 24 is of generally conventional design, but is characterized by having a minimum of wearing components and is suitable for smooth coupling of high speed components of the present type. A signal activating the coupling 24 may be provided from coupling control 32, in response to a manual or thermostatically induced input from ambient air temperature sensor 33 to control logic 35. This latter unit provides in a conventional manner, signal outputs for activating solenoid controlled valves or similarly activated elements in the present system 10.

Refrigeration compressor 22, as previously indicated, is part of a conventional Rankine refrigeration cycle. The other components in this sub system include a condenser 31, a reservoir 34, a sub-cooler and superheat exchanger 36, an expansion valve 38, and an evaporator 40. All of these cited components are connected in series as indicated by the flow lines therebetween, so as to provide a conventional refrigeration system. In such system it is seen that the evaporator coil 40 is contained within an air duct 42, which is the heat exchanger duct providing cooling by means of the FIG. 1 system. Similarly, the condenser 31 is seen to be positioned in a second air duct 44, which is the heat exchanger duct providing heating of an air stream 45 in the system 10. Also positioned in the heating air duct 44 is an exhaust heat recovery exchanger 46, which is connected to the exhaust outlet stream 48 from turbine 12. This arrangement permits additional heat to be abstracted from the turbine exhaust gases.

Air streams ducted over evaporator coil 40 and condenser coil 31 transfer heat to and from the refrigeration system, as is known in the art, and the air streams are cooled and heated accordingly. Referring to air duct 42, the present system is typically designed so that the evaporator coils 40 operate near 40°F, both in winter and summer. In the summer the air stream which enters the duct from the building or other facility being cooled, e.g., via a schematically suggested conduit 56, valved at 58, is cooled, and dehumidified by the said coils 40, the returning by a conduit 60, valved at 62, back to the building. In the winter, however, the outside air temperature can drop below 40°F, whereby no heat would be transferred to the evaporator since the facility air stream is derived from ambient air. Not only does the system thus become less efficient, but as previously indicated, moisture can begin to collect on the said coils so as to form ice and eventually block the air flow. Accordingly, in accordance with the present invention, during the winter period the mechanical coupling 24 and thus the reverse Brayton air cycle heat pump are energized. The outside air enters at 49 to air compressor 28 and is compressed, thus is heated by compression to approximately 200°F, and passed via the schematically indicated path 50 and valve air duct 52 into air duct 42, and thereupon in heat exchange with the evaporator coils 40. During the winter operation both the valves 52 and 54 are adjusted to regulate the pressure within duct 42, as to provide an overpressure therein with respect to ambient. The valves 58 and 62 are closed during this operation. The somewhat cooled air, after passing through valve 54 and the flow path indicated at 64, is then passed to air turbine 30 where it is expanded, and the very cold air then passed out into the atmosphere via conduit 66. The cold air returned to the outside atmosphere is at a temperature below that of the ambient outside air which entered the air compressor 28, thus heat is pumped (or removed) from the ambient atmosphere. The reverse Brayton cycle can remove heat from the outside ambient air even when such ambient air is at an extremely low temperature. The returned, expanded air is still returned to atmosphere at a temperature below the air intake to the reverse Brayton cycle system, thus some heat is removed even from very cold ambient air. The frozen moisture (snow) may be separated by gravity at the port 68, and can, if desired, be melted by using the residual heat from the prime mover exhaust stream, e.g. by taking off part of stream 48. The air turbine 30 further, as has already been mentioned, is mechanically connected to compressor 28; thus it provides a portion of the power to drive the said compressor 28. In some applications it may also be desirable to provide a thermal sotrage unit 71 in the duct 42, so as to permit on-off cycling of the air cycle heat pump. Such unit 71 may, for example, comprise an array of finned tubes filled with circulating liquid from a storage reservoir.

The heat/cool system 10 operates winter and summer with fuel provided at input 14, and the only further additional input requirements are atmospheric air and lubricating oil. Water is not required. A small amount of utility electric power is required for the distribution of conditioned air, and for temperature and humidity controls. The distribution system is of conventional design, and is not per se part of the present invention.

As indicated above, the air compressor 28 and coupled air turbine 30 are intended for heat cycle operation in winter only. The function of this high speed equipment is to mechanically compress cold outside air to a temperature significantly higher than the temperature of the evaporator coils. The compressed air then gives up heat which is heat pumped into the building and used by the reverse heat pump operation of the Rankine cycle. The cooled compressed air is then expanded through the air turbine, and the resulting very cold air returned to atmosphere at a temperature below that of the outside air initially compressed.

Figure 2:
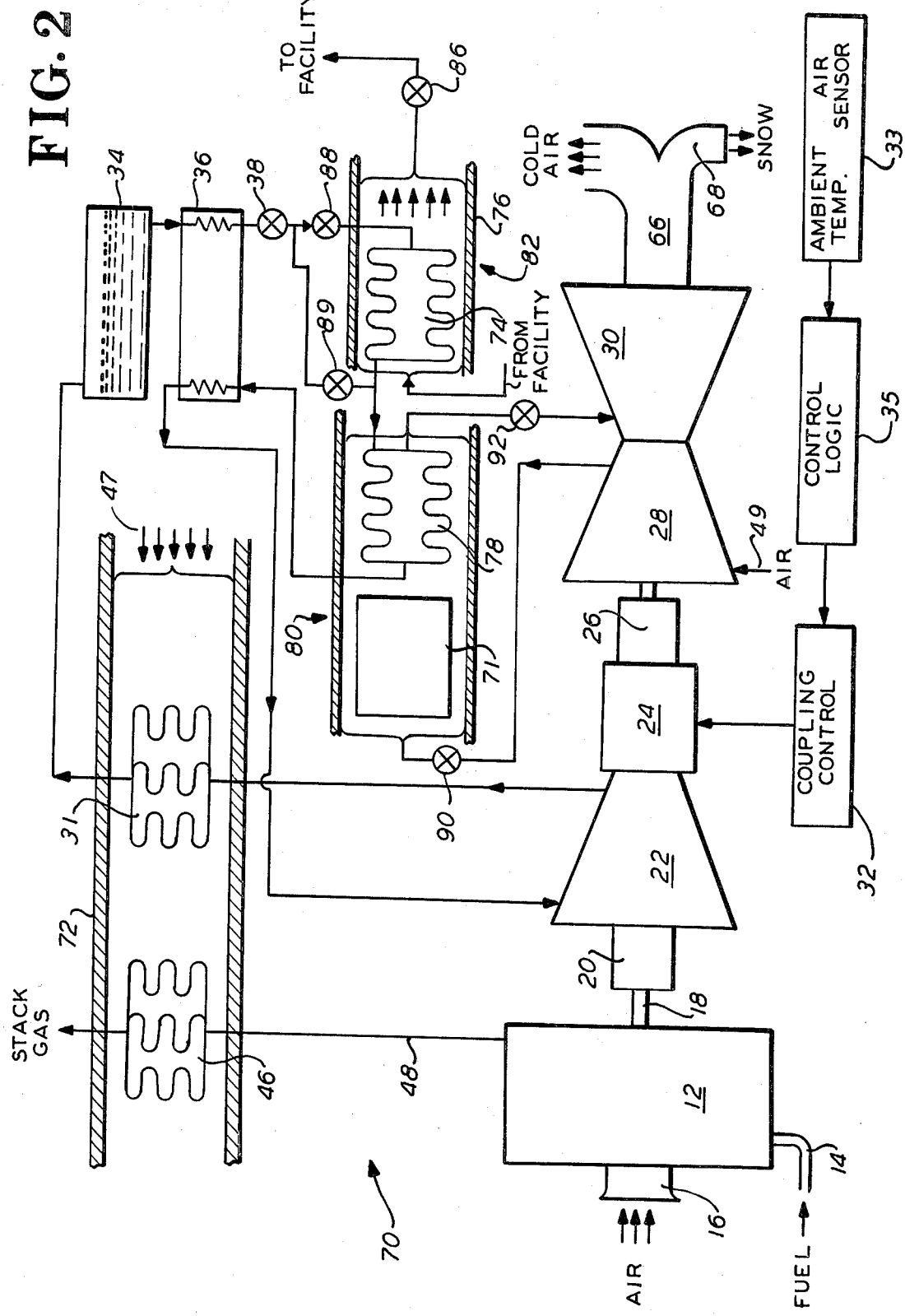
FIG. 2 is a simplified schematic diagram, depicting a modified form of the FIG. 1 system, enabling use of the said system with a water thremal distribution system.

In FIG. 1, the distribution system is, as indicated, based on air ducting. Many buildings, however, utilize a hot and chilled water system instead of air distribution. Accordingly, in FIG. 2 a heat/cool system 70, generally similar to that set forth in FIG. 1 is shown, but utilizing a water thermal distribution system. The same components in FIG. 2 as are used in FIG. 1 are indicated by the same numbers for convenience. The condenser 32 and exhaust heat recovery exchanger 46 are, in this instance, installed in a hot water pipe 72 instead of a hot air duct 44 as in FIG. 1. Heating for the associated facility is provided by means of the water stream 47 passed through pipe 72. Two cold exchangers 82 and 80 are used. The first includes an evaporator 74 for the cold water pipe 76 forming the heat exchanger 82 portion of the system used in the summer; and the second, an evaporator 78 which is used in the winter with the air heat exchanger 80, in conjunction with the air output from the reverse Brayton air cycle heat pump. During winter use, control logic 35, in response, e.g., to an indication from sensor 33 that ambient temperature is below a prescribed value, closes valves 86 and 88, to remove exchanger 82 from the Rankine cycle, and opens valves 89, 90 and 92 to dispose evaporator 78 in the said cycle. Simultaneously, and as previously discussed, an output from coupling control 32 is enabled to activate the Brayton air cycle heat pump.

While the present invention has been particularly set forth in terms of specific embodiments thereof, it will be understood in view of the present disclosure, that numerous variations upon the invention are now enabled to those skilled in the art, which variations yet reside within the scope of the teaching. Accordingly, the invention is to be broadly construed and limited only by the scope and spirit of claims now appended hereto.

We claim:

1. A combined heating and cooling system for an environment comprising in combination
   first and second heat exchangers,
   a refrigeration system comprising a refrigerant compressor for compressing a refrigerant working fluid,
   a condenser in heat exchange relationship with said first heat exchanger for receiving said compressed working fluid wherein said fluid is condensed and transfers heat energy to said first heat exchanger,
   means to expand said condensed working fluid,
   evaporator means to receive said expanded working fluid, said evaporator means being in heat exchange relationship to said second heat exchanger wherein said expanded working fluid receives heat from said second heat exchanger,
   said second heat exchanger further including means to receive ambient air from outside the environment to provide at least part of the heat received by said working fluid in said evaporator, said evaporator adapted to be maintained at a predetermined temperature,
   heating means to heat the outside ambient air received by said second heat exchanger to a temperature above said predetermined temperature, said heating means comprising an air compressor adapted to receive outside ambient air at ambient temperature and to compress and heat said outside ambient air to a temperature above said predetermined temperature,
   an expander means adapted to receive and expand said heated ambient air after said ambient air has transferred heat to said working fluid in said evaporator, said expander adapted to discharge said ambient air at a temperature below said ambient temperature,
   control means adapted to operate said heating means when the outside ambient temperature is below said predetermined temperature.

2. A combined heating and cooling system as defined in claim 1 wherein said first and second heat exchangers are air ducts wherein air is circulated for respectively heating and cooling the environment.

3. A combined heating and cooling system as defined in claim 1 wherein said control means includes a temperature sensor for sensing the ambient air temperature to energize said heating means when the sensed ambient temperature is below said predetermined temperature.

4. A combined heating and cooling system as defined in claim 3 wherein a prime mover powers both said refrigerant compressor and said air compressor.

5. A combined heating and cooling system as defined in claim 3 wherein said expander is connected by a rotating shaft to said air compressor and said expander provides power to said air compressor.

6. A combined heating and cooling system as defined in claim 5 wherein a prime mover powers both said refrigerant compressor and said air compressor.

7. A combined heating and cooling system as defined in claim 6 wherein said prime mover, said refrigerant compressor and said air compressor are mounted for operation on a common shaft, said control means further comprising a coupling in said shaft between said refrigerant compressor and said air compressor, said control means activating said coupling to actuate said air compressor when the ambient outside temperature is below said predetermined temperature.

8. A combined heating and cooling system as defined in claim 6 wherein said prime mover is a gas turbine and said system further includes an exhaust heat recovery exchanger in heat exchange relationship with said first heat exchanger to transfer heat energy from said gas turbine exhaust gases to said first heat exchanger.

* * * * *